April 17, 1934.  A. L. SPAFFORD  1,955,443
INSULATING STRUCTURE AND LINER
Filed June 17, 1931
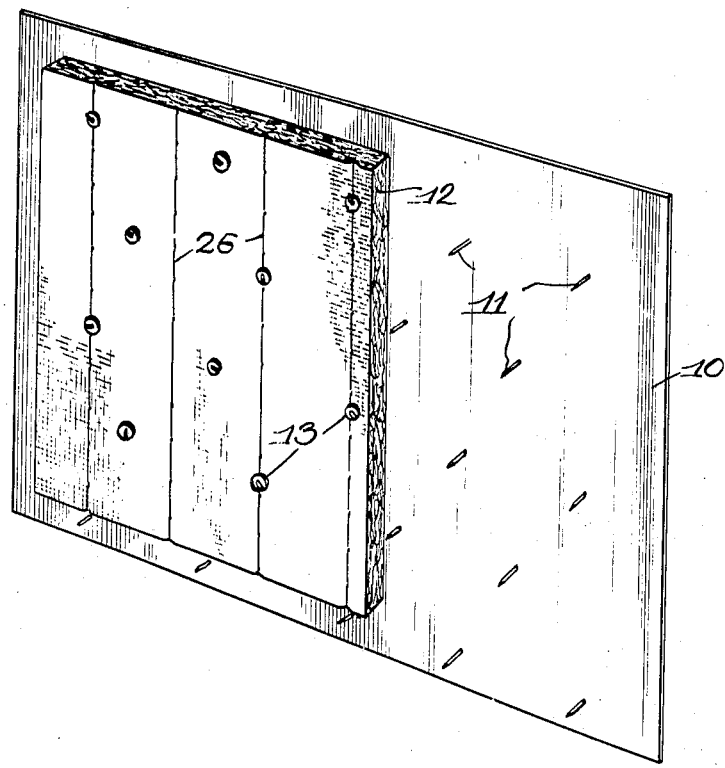
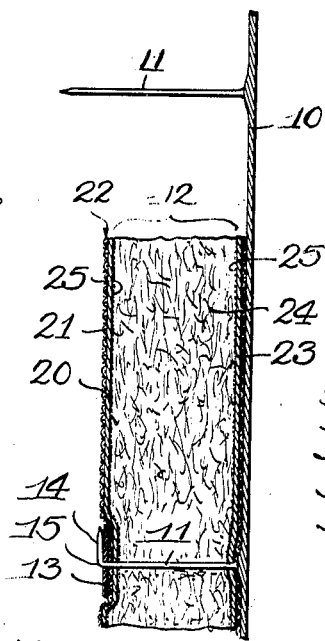
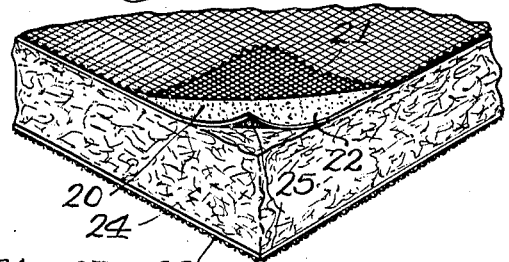
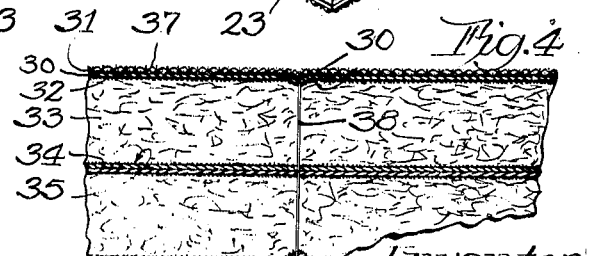
Witness:
Chas. V. Koursh
Inventor,
Allen L. Spafford
By W. Bartlett Jones  Atty.

Patented Apr. 17, 1934

1,955,443

UNITED STATES PATENT OFFICE 1,955,443

INSULATING STRUCTURE AND LINER

Allen L. Spafford, Cloquet, Minn., assignor to Wood Conversion Company, Cloquet, Minn., a corporation of Delaware Application June 17, 1931, Serial No. 545,032

10 Claims. (Cl. 189—85)

The present invention relates to insulation material, and in particular to an improved structure and structural element thereof. The insulation is primarily intended for heat and cold but it has valuable sound deadening and absorbing properties as well. The new structural element is a reinforced or strengthened sheet of paper-like material.

The improvements in insulation relate particularly to a structure which improves the fireproof qualities of the insulation; which permits easy and rapid installation of the material; which protects the material from injury during installation; and which preserves the form of the material after it is installed. The invention is particularly adapted to use with a certain method of mounting insulation blankets, which method is commonly employed in the construction of steel passenger coaches on railroads, but it is of course not limited to any special field. However, it will be explained in connection with its use as steel car insulation.

It is a well established practice to mount an insulation blanket on a steel sheet of a structure, such as may be found in a passenger car, so that the walls of the car are well insulated. A variety of forms of blanket may be employed. Fire-proof qualities are preferred for the reason that fire danger in a wreck is minimized. To this end fire-resistant lines, such as asbestos sheets, are used on blankets of insulation material. A particular form of blanket comprises a fibrous mat between asbestos paper sheets. Hair, felt or other fibers may be employed. One method of installation is to impale the blanket on pins or studs carried by sheet metal or surface of other material, so that the pins pass through the blanket. The ends of the pins are then suitably employed to retain the blanket.

One disadvantage of fire-resistant sheets, such as asbestos paper, is fragility. Asbestos paper is brittle in character. It tears easy and is not strong and tough. In the process of impaling and securing, above referred to, the liner, such as asbestos paper, easily breaks or tears when punctured at one or more or at many or all pins, so that mounting is not perfect. Vibrations of a railroad coach may gradually loosen the insulation and increase the breaks or tears so that eventually the insulation may become partially or wholly detached.

One object of the present invention is the provision of a reinforced asbestos sheet.

Another object of the invenion is the provision of an insulation blanket having a reinforced sheet as a liner therefor.

A particular object is the provision of an asbestos sheet with one or more series of strong threads carried by the sheet as a part thereof.

Still another object is the provision of an asbestos sheet with a woven fabric adhesively united to the asbestos.

A further object of the invention is the provision of a durable insulated construction for wall or ceiling, especially one which is built on a sheet metal base.

Various other and ancillary objects and advantages of the invention will be apparent from the following description and explanation of the invention which refers in detail to several illustrative embodiments of the invention appearing in the accompanying drawing in which:

Fig. 1 represents a wall, as of sheet metal, carrying impaling pins over a number of which a blanket is shown impaled and secured.

Fig. 2 is a cross-section of the structure shown in Fig. 1 illustrating the method of impaling and securing, and the structure of an insulated wall or the like.

Fig. 3 represents one form of blanket.

Fig. 4 represents a modified form of blanket.

It is to be understood that the disclosed embodiments are not to be considered as limitations of the invention, that various changes and modifications may be made, and that such changes and modifications are contemplated in defining the invention in the appended claims.

In the drawing 10 represents a wall surface to be insulated, preferably a sheet metal plate, such as is found in the ceilings and walls of a steel railroad coach. Projecting from the wall surface are a number of pins 11 which may be steel pins welded to the steel plate 10. The pins preferably are longer than the thickness of a blanket or insulation pad which is to be placed over them. Any suitable blanket, such as that shown in Fig. 1 and those later to be described as having two liners, is referred to at this point to indicate one way in which it may be secured. Such an exemplary blanket 12 is impaled on said pins 11 which are caused to project therethrough. When the pins emerge from within the blanket through the outside sheet of liner, the tendency to tear and break is much greater than exists on an inside liner, because there is no portion of the structure to back up the liner. Discs 13 having holes, or which may be readily punctured by the pins to form holes, are next impaled over the projecting pins 11. Large discs are required where the tearing may be considerable. In securing the blanket on the pins, the blanket may be slightly compressed by pushing on a disc, and then fastening means is provided to hold the disc. A suitable fastening means is the end 14 of a deformed pin 11, turned to lie on the disc by bending at 15 to a right angle.

It is this process of impaling and securing that is injurious to fragile paper-like liners on insulation, particularly an asbestos liner on a blanket of loosely matted fiber. Such paper is not sufficiently strong, so that frequently it gives away under vibrations and bursts forward from around the discs 13. In order to overcome this disadvantage the fragile liner, such as asbestos paper, is reinforced. A cotton thread is a cheap and strong reinforcing agent and I prefer to use it, but I do not limit myself to use of it, nor to any specific manner of using it or other materials, as will appear hereinafter.

In order to reinforce an asbestos sheet of paper a stronger material must be used. This may be incorporated into the paper in manufacture or it may be subsequently applied. I prefer great strength in all directions, so I prefer to use several series of long strands or threads for such reinforcement, the several series extending in different directions. This may well be supplied by a woven fabric such as mesh cloth or netting. It may be incorporated inside or outside the asbestos paper, or other fragile liner, but there are important considerations in so doing.

Ordinary cotton thread, in the form of woven cloth is difficult to incorporate in a satisfactory manner inside of asbestos paper when the paper is fabricated with water, because the shrinkage characteristics of the cotton and of the asbestos paper are not the same and a bad sheet is formed. However, other materials, or cotton itself may be so employed where conditions are such as to equalize the shrinkage properties, or to prevent shrinkage.

In order to use threads or cloth as of cotton, I have found that the most satisfactory method is to apply the reinforcing material to the preformed asbestos sheet, employing an adhesive to unite the two. This may be done on a large scale by uniting traveling webs of a fabric and of asbestos sheeting between rolls or by passage together over a single roll, first wetting the fabric with adhesive, such as a starch paste. The reinforcement may be placed between two layers of asbestos paper but where it is to be used on a liner for insulation to be impaled, it is preferable to have the reinforcement on the exterior of the liner and of the insulation.

In Fig. 3 such a sheet is illustrated. It comprises a sheet of asbestos paper 20 on which there is a cloth fabric 21 secured by adhesive 22. A similar reinforced asbestos sheet designated 23 is used as a similar liner, and both are used to enclose a fibrous insulation mat 24 such as loosely felted wood fibers, known as "Balsam Wool", and described in U. S. Weiss Patent No. 1,336,402. The wood fibers are adhesively united into a mat. The mat is adhesively united to the liner 23 and the asbestos sheet 20, by means of a suitable adhesive on the face of the liners. I prefer to employ a water-proof adhesive, such as asphalt, indicated at 25. The cloth or fibrous reinforcement 21 and the fibers of the mat may be and preferably are suitably fire-proofed, as for example by the process of the U. S. Weiss Patent No. 1,339,488. The fibers may also be water-proofed, or they may be simultaneously fire-proofed and water-proofed in any well known manner. In order to increase the strength of the blanket it is quilted or stitched through as illustrated at 26 in Fig. 1. For a blanket of about one inch in thickness, parallel stitching may be spaced apart about 3 or 4 inches, and a stitch may be from ½ to ¾ inches long. These dimensions are by no means limitations, and are given merely to convey a more definite idea of the sizes and proportions of the various elements which appear in the drawing.

Another form of blanket is illustrated in Fig. 4. This is made of two blankets quilted or stitched together. Each blanket is constructed with an asbestos sheet liner 30, to which is adhesively applied a fabric 31. A cement like asphalt 32 binds the liner to a fibrous mat 33, such as felted wood fibers adhesively united to each other. The remaining liner may be a paper sheet, such as kraft paper 34 secured by a layer of cement like asphalt 35 to the fibrous mat. Each of these blankets may be thinner than the blanket of Fig. 3, and in superimposing them the asbestos liners are placed on the outer sides. The two blankets are then housed between layers of cloth or fabric, which may be the same as that carried by the asbestos sheet. The layers may be carried loosely, that is without adhesive union. They are indicated at 36 and 37 and are held together and to the blankets by rows of spaced parallel stitching 38.

The extra layer of reinforcement strengthens the liner and the entire blanket, serving particularly to strengthen the sheet where the stitching 38 is employed and where the discs and impaling pins are present. The adhesively united layer of fabric, or other reinforcement for the liner, preserves the continuity of the sheet, and should it break, or crack, the reinforcement limits extension of the break and holds the pieces together, so that little damage will result.

The invention is particularly adaptable to use on railway cars, not only because it will resist damage by constant motion and vibration, but because it is specially suited for a method now in use for mounting blankets in such places. Its advantages are not limited to this particular use however.

Although I have described the invention with reference to fire-proofed wood fibers, with asbestos paper liners, it will be understood that this is a preferred construction for use on railway coaches having the impaling pins. Fire-proofing may be dispensed with for other uses, and ordinary ground wood, semi-cooked or chemically cooked vegetable fibers may be used in the paper liner rather than asbestos fibers, and the reinforcing means used in connection with such paper. Such paper is normally stronger than asbestos paper, and is more adapted to withstand an impaling process of installation. However, it may break easily, and on aging it becomes brittle and may then more easily break away, making it very advantageous to have an insulation blanket with a reinforced liner.

In the appended claims I aim to define the invention as including a particular element, which is new and useful, an insulation blanket preferably comprising such element, and an insulaiton structure employing such blanket.

I claim:

1. An insulated structure comprising a support, impaling pins carried by said support, an insulation blanket impaled on said pins, said insulation blanket having an exposed paper liner and reinforcing means therefor, both penetrated by said pins, and means to hold said blanket impaled on said pins.

2. An insulated structure comprising a support, impaling pins carried by said support, an insulation blanket impaled on said pins, said insulation blanket having an exposed paper liner and reinforcing means therefor both penetrated by said pins, and discs impaled on said projecting pins, a disc being held thereon by a bent portion of the pin.

3. An insulated structure comprising a support, impaling pins carried by said support, an insulation blanket impaled on said pins, said blanket comprising insulation material housed between paper liners and having fabric adhesively applied to the outside of said liners, and means acting both on the exterior face of the blanket and on projecting ends of said pins to hold the blanket on said impaling pins.

4. An insulated structure comprising a support, impaling pins carried by said support, an insulation blanket impaled on said pins, said insulation blanket comprising an insulating filler, a lining sheet adhesively united to the filler, and a reinforcing network adhesively united to one face of the liner, said pins projecting through said blanket, and means to hold said blanket impaled on said pins.

5. An insulated structure comprising a support, impaling pins carried by said support, an insulation blanket impaled on said pins, said insulation blanket comprising an insulating filler, a lining sheet secured to said filler, and a reinforcing network adhesively united to one face of the liner, said pins projecting through said blanket, and means to hold said blanket impaled on said pins.

6. An insulated structure comprising a support, impaling pins carried by said support, an insulation blanket impaled on said pins, said insulation blanket comprising an insulating filler, a lining sheet secured to said filler, and a reinforcing network adhesively united to the outer face of said liner, said pins projecting through said blanket, and means to hold said blanket impaled on said pins.

7. An insulated structure comprising a support, impaling pins carried by said support, an insulation blanket impaled on said pins, said insulation blanket comprising a fire-resistant filler, a fire-resistant sheet liner secured to both faces of said filler, and a reinforcing network secured at the interface to one face of each liner, said pins projecting through said blanket, and means to hold said blanket on said pins.

8. An insulated structure comprising a support, impaling pins carried by said support, an insulation blanket impaled on said pins, said insulation blanket comprising an insulating filler, a sheet liner secured to said filler, and a reinforcing network secured at the interface to one face of said liner, said pins projecting through said blanket, and means to hold said blanket impaled on said pins.

9. An insulated structure comprising a support, impaling pins carried by said support, an insulation blanket impaled on said pins, said insulation blanket comprising an insulating filler, a sheet liner secured to said filler, and a reinforcing network secured at the interface to the outer side of said liner, said pins projecting through said blanket, and means to hold said blanket impaled on said pins.

10. An insulated structure comprising a support, impaling pins carried by said support, an insulation blanket impaled on said pins, said insulation blanket comprising an insulating cushion of loosely associated fibers, a sheet liner secured to said filler at the side remote from said support, and a reinforcing network secured at the interface to one side of said liner, said pins projecting through said blanket, and means to hold said blanket impaled on said pins.

ALLEN L. SPAFFORD.